(12) United States Patent
Zhang et al.

(10) Patent No.: US 10,410,128 B2
(45) Date of Patent: Sep. 10, 2019

(54) METHOD, DEVICE, AND SERVER FOR FRIEND RECOMMENDATION

(71) Applicant: TENCENT TECHNOLOGY (SHENZHEN) COMPANY LIMITED, Shenzhen (CN)

(72) Inventors: Wenlong Zhang, Shenzhen (CN); Feng Jiao, Shenzhen (CN); Bin Wang, Shenzhen (CN); Lei Zeng, Shenzhen (CN); Xiaohui Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 658 days.

(21) Appl. No.: 15/101,314

(22) PCT Filed: Dec. 12, 2014

(86) PCT No.: PCT/CN2014/093661
§ 371 (c)(1),
(2) Date: Jun. 2, 2016

(87) PCT Pub. No.: WO2015/085948
PCT Pub. Date: Jun. 18, 2015

(65) Prior Publication Data
US 2016/0307101 A1   Oct. 20, 2016

(30) Foreign Application Priority Data
Dec. 13, 2013   (CN) .......................... 2013 1 0689161

(51) Int. Cl.
*G06N 5/04*     (2006.01)
*G06F 16/2457*  (2019.01)
(Continued)

(52) U.S. Cl.
CPC ....... *G06N 5/045* (2013.01); *G06F 16/24578* (2019.01); *G06Q 50/01* (2013.01);
(Continued)

(58) Field of Classification Search
CPC ....................................................... G06N 5/04
(Continued)

(56) References Cited

U.S. PATENT DOCUMENTS

2012/0005204 A1*   1/2012   Diaz ...................... G06N 5/048
                                                                 707/733

FOREIGN PATENT DOCUMENTS

CN          101540739 A        9/2009

OTHER PUBLICATIONS

Zheng et al ("GeoLife: A Collaborative Social Networking Service among User, Location and Trajectory") (Year: 2010).*
(Continued)

*Primary Examiner* — Lut Wong
(74) *Attorney, Agent, or Firm* — Anova Law Group, PLLC

(57) ABSTRACT

Methods, devices, and servers for friend recommendation are provided. A user association set of a target user is obtained. Original data of each associated user in the user association set is obtained. The original data include location relationship data, associated friend data, time relationship data, or combinations thereof, between each associated user and the target user. The original data of each associated user is screened to obtain feature data to form a feature collection for each associated user. A pre-configured N-Tree prediction model is used to process the feature collection for a prediction calculation to obtain an association-predicting value for each associated user. According to the association-predicting value of each associated user, a friend user for the target user
(Continued)

from the user association set is determined and recommended to the target user.

10 Claims, 6 Drawing Sheets

(51) Int. Cl.
  *G06Q 50/00* (2012.01)
  *H04L 29/08* (2006.01)
  *H04L 29/06* (2006.01)
  *H04W 4/21* (2018.01)
(52) U.S. Cl.
  CPC .......... *H04L 67/306* (2013.01); *H04L 67/42* (2013.01); *H04W 4/21* (2018.02)
(58) Field of Classification Search
  USPC .......................................................... 706/45
  See application file for complete search history.

(56) References Cited

OTHER PUBLICATIONS

The World Intellectual Property Organization (WIPO) International Search Report for PCT/CN2014/093661 dated Mar. 13, 2015.

* cited by examiner

METHOD, DEVICE, AND SERVER FOR FRIEND RECOMMENDATION

CROSS-REFERENCES TO RELATED APPLICATIONS

This application claims priority to PCT Application No. PCT/CN2014/093661, filed on Dec. 12, 2014, which claims priority to Chinese Patent Application No. 2013106891611, filed on Dec. 13, 2013. The entire content of the two applications is incorporated herein by reference.

FIELD OF THE DISCLOSURE

The present disclosure generally relates to the field of computer application technology and, more particularly, relates to methods, devices, and servers for friend recommendation.

BACKGROUND

With rapid development of Internet technology, social network service (SNS) has also been rapidly developed. Relationship chain is important in SNS. For example, relationship between users, user-generated content (UGC) via Internet, user forwarding, comments, user-interested content, and/or interactions between users in SNSs are often based on the relationship chain as for spread and dissemination. Development and maintenance of the relationship chain are therefore very crucial.

In existing SNS technology, expansion of relationship chain and friend recommendation may use common relationship between two people to find some overlaps including, public city, common school, same company, mutual friend, and other factors, used to determine whether to extend the relationship chain, or whether there is a need to recommend a friend. However, evaluation of a weight value of these factors is often empirically identified and artificially configured. Consequently, the configuration of weight value is fixed, which does not facilitate accurate expansion of the relationship chain for the user.

BRIEF SUMMARY OF THE DISCLOSURE

One aspect or embodiment of the present disclosure includes a method for friend recommendation. A user association set of a target user is obtained. The user association set includes a plurality of associated users that are associated with the target user. Original data of each associated user in the user association set of the target user is obtained. The original data include location relationship data, associated friend data, time relationship data, or combinations thereof, between each associated user and the target user. The original data of each associated user is screened to obtain feature data to form a feature collection for each associated user. A pre-configured N-Tree prediction model is used to process the feature collection for a prediction calculation to obtain an association-predicting value for each associated user. According to the association-predicting value of each associated user, a friend user for the target user from the user association set is determined and recommended to the target user.

Another aspect or embodiment of the present disclosure includes a device for friend recommendation. The device includes an obtaining module, a collecting module, a processing module, and a recommending module. The obtaining module is configured to obtain a user association set of a target user. The user association set includes a plurality of associated users that are associated with the target user. The obtaining module is further configured to obtain original data of each associated user in the user association set of the target user. The original data include location relationship data, associated friend data, time relationship data, or combinations thereof, between each associated user and the target user. The collecting module is configured to screen the original data of each associated user to obtain feature data to form a feature collection for each associated user. The processing module is configured to use a pre-configured N-Tree prediction model to process the feature collection for a prediction calculation to obtain an association-predicting value for each associated user. The recommending module is configured, according to the association-predicting value of each associated user, to determine a friend user for the target user from the user association set and recommend the friend user to the target user.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
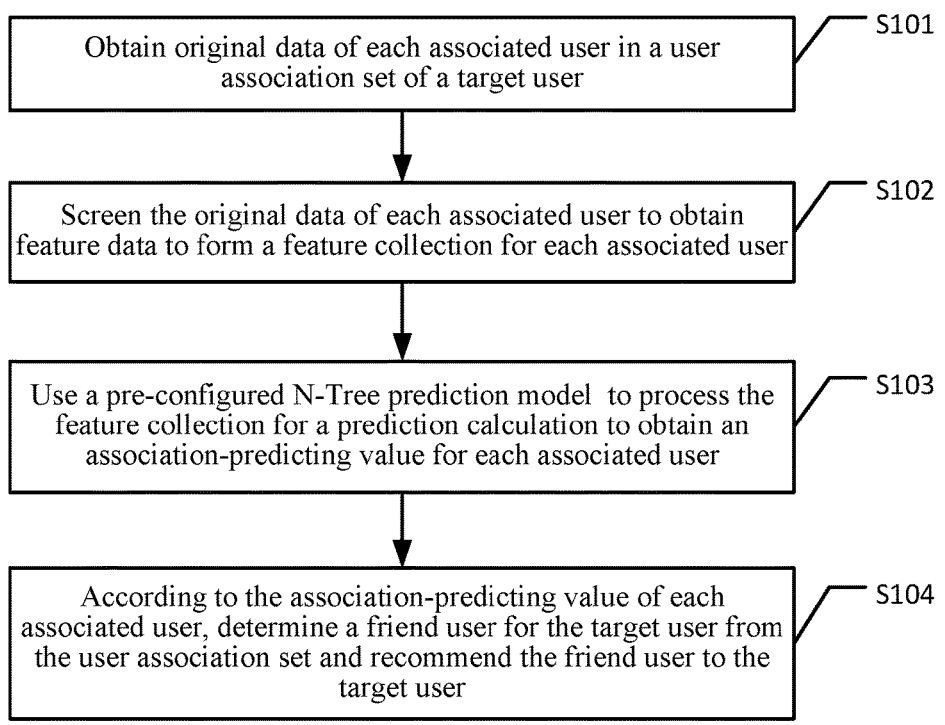
FIG. 1 depicts an exemplary method for friend recommendation consistent with various disclosed embodiments.

FIGS. 1-9 depict exemplary methods, devices, and servers for friend recommendation, e.g., in a social network service (SNS) consistent with various disclosed embodiments. For example, disclosed methods as shown in FIG. 1 can be used in various application servers: including communication applications, social networking applications, and/or other types of applications. When a user accesses to an application or initiates to find a friend, the user can be a target user to trigger the implementation of the disclosed methods for recommending one or more friends.

In Step S101, a user association set of a target user is obtained. The user association set includes associated users that are associated with the target user. Original data of each associated user in the user association of the target user is obtained.

The original data can include, for example, location relationship data, associated friend data, time relationship data, or combinations thereof, between each associated user and the target user.

In an exemplary embodiment, a user association set formed by one or more other users (users other than the target user, also referred to as "associated users") associated with the target user can be determined from a registration server, based on a current location of the target user, a registered company that the target user is related to, an industry and/or school that the target user is related to, Zodiac sign of the target user, and/or any suitable content related to the target user.

The user association set can include one or more associated users, for example, from a same school or in a same school within a same time frame. Meanwhile, current locations, registered companies, industries, schools, Zodiac signs, birth places, and/or birth dates of these associated users can be used as original data.

In Step 102, the original data of each associated user are screened to obtain feature data to form a feature collection for each associated user.

For extracted original data, some data may not be useful for current recommendation. For example, initial data such as birth place, birth date, and/or other information may be determined useless for a current recommendation process. In this case, such initial data can be removed from consideration, while current locations, registered companies, industries, schools, and/or other suitable data from extraction can be used as feature data. The feature data can be collected to form a feature collection for each associated user.

In Step S103, a pre-configured N-Tree prediction model is used to process the feature collection for a prediction calculation to obtain an association-predicting value for each associated user.

The N-Tree prediction model is based on GBDT (i.e., gradient boosting decision tree) prediction model. By a prediction model containing multiple GBDTs pre-configured with corresponding weight values, the association-predicting value, under a corresponding weight value, of the feature collection of each associated user can be obtained.

Note that, the N-Tree prediction model is not a decision tree model formed by only one decision tree, but includes multiple decision trees, for example, about hundreds of decision trees with each decision tree having a reduced scale/size (e.g., the depth of each decision tree can be shallow). When predicting using the N-Tree prediction model, an inputted feature collection can be a collection (or combination) of, for example, city, company, and/or school. Each decision tree can have a weight value pre-configured at every tree node. When traversing each decision tree for prediction calculations, based on the weight value at every tree node for each decision tree, the collection can be processed for the prediction calculation to obtain a prediction value of each decision tree.

An initial weight value can be manually configured, according to whether the feature data in the feature collection are the same as data of the target user. For example, a weight value corresponding to a tree node that both of the two are in a same city can be 2, while a weight value corresponding to a tree node that the two are not in a same city can be 0.5. Weight value of the tree node in different decision trees can be different depending on a loss function.

According to the weight value at each tree node, the prediction value of each decision tree can be obtained. Then all of the prediction values can be added up to obtain a final association-predicting value under the feature collection of this associated user. The following formula can be used.

$$F(x)=F_0+\beta_1 T_1(x)+\beta_2 T_2(x) \ldots +\beta_M T_M(x) \tag{I}$$

where M is a natural number greater than 2; $F_0$ is a configured initial weight value, $T_i$ is the $i^{-th}$ tree (or tree i). With respect to the feature collection, for different problems (regression problems or classification problems) and different loss functions selected in GBDTs, corresponding weight value can be configured differently (not the same).

In Step S104, according to the association-predicting value of each associated user, a friend user for the target user is determined from the user association set and the friend user is recommended to the target user.

Note that, recommendations of the relationship chain can include, but be not limited to, friend recommendations, review/comment recommendations, interested-news recommendations, and/or other information recommendations.

As disclosed, by extracting feature data to provide relationship factors of users, the N-Tree prediction model can be used to automatically determine degree of association between the target user and user(s) to be recommended. Interactions between end user (target user) and recommended user(s) are improved, which can facilitate users to expand the relationship chain. Friend recommendation can thus be automated and intelligent.

Figure 2:
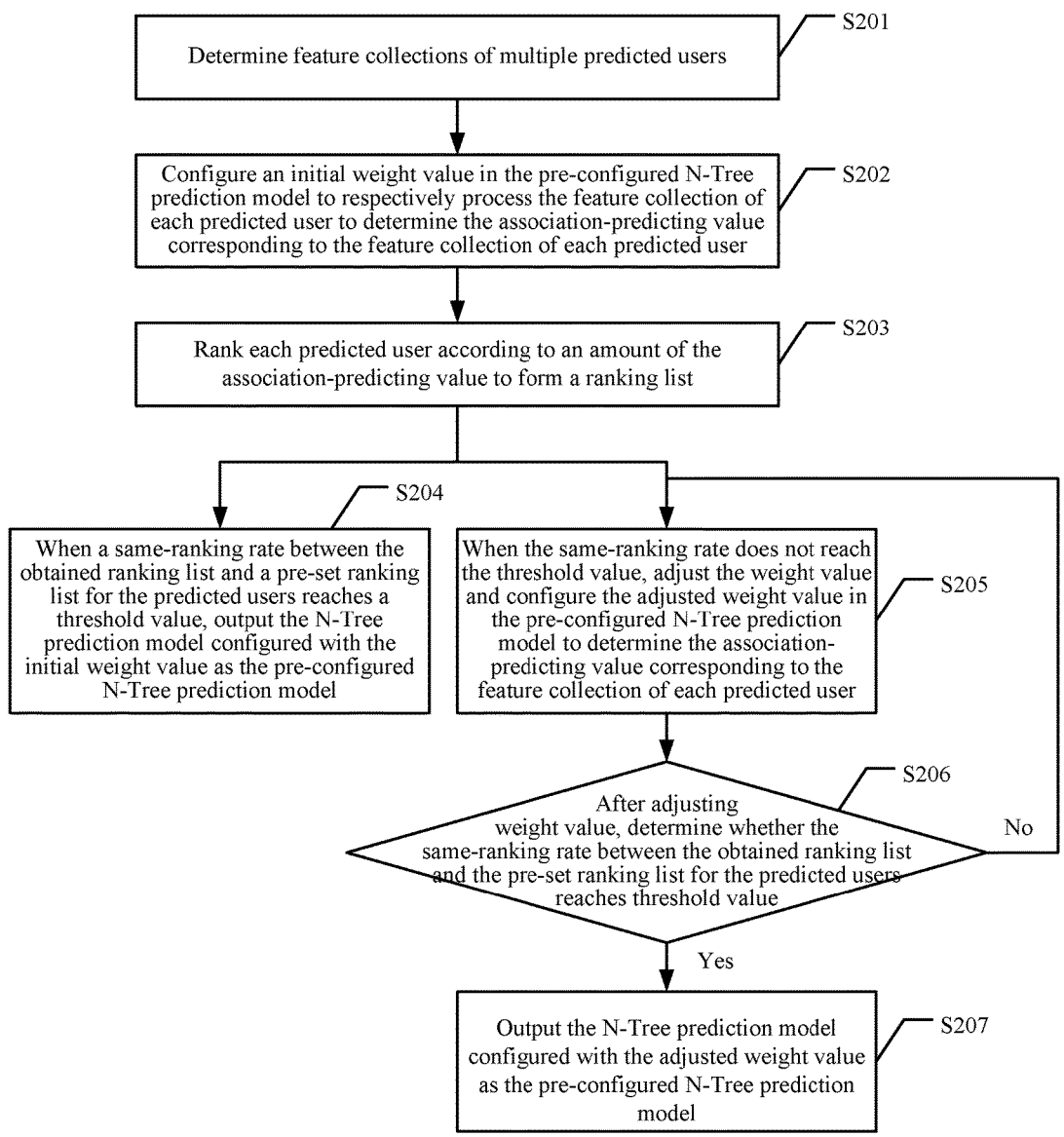
FIG. 2 depicts an exemplary pre-configured N-Tree prediction model consistent with various disclosed embodiments.

FIG. 2 depicts an exemplary pre-configured N-Tree prediction model consistent with various disclosed embodiments. In the exemplary method, N-Tree prediction model can be pre-configured to obtain association-predicting value of determined feature collection, as described in FIG. 1.

In Step S201, feature collections of multiple predicted users are determined. These predicted users can be virtual users. The feature collection can be a collection/combination of feature data of a corresponding virtual user with a possible target user.

In Step S202, an initial weight value is configured in the pre-configured N-Tree prediction model to respectively process the feature collection of each predicted user for the prediction calculation to determine the association-predicting value corresponding to the feature collection of each predicted user.

In Step S203, each predicted user is ranked according to an amount of the association-predicting value to form a ranking list.

In Step S204, when a same-ranking rate between the obtained ranking list and a pre-set ranking list for the predicted users reaches a threshold value, the N-Tree prediction model configured with the initial weight value is outputted as the pre-configured N-Tree prediction model.

In one example, during a pre-configuring process, the user can first configure five virtual/predicted users A, B, C, D, and E. A pre-set ranking list can be formed by: setting a cohesion degree (corresponding to the prediction value) of a relationship between these five virtual users and the possible target users in a ranking order as, for example, A, C, B, D, and E.

After the calculations in Steps S202-S204, the association-predicting value of each feature collection can be calculated according to the N-Tree prediction model having a weight value configured corresponding to the feature collections and the tree nodes. The association-predicting value can be used to characterize a degree of cohesion (or association) between these five virtual users A, B, C, D, and E, and the possible target user. A ranking list can thus be obtained according to the association-predicting value. After the obtained ranking list and the pre-set ranking list for the predicted (or virtual) users are compared with each other, a number of users (e.g., one or more users from these predicted/virtual users) having a same ranking in both lists of the obtained ranking list and the pre-set ranking list can be selected. The "same-ranking" rate can therefore be determined by a ratio between an amount of these selected users over an amount of total number of users.

For example, according to the association-predicting value, an obtained ranking list can include: A, C, B, E and D. Compared with the exemplary pre-set ranking list as described above of A, C, B, D and E, three users A, C, and B (among the five virtual/predicted users A, B, C, D, and E) each has same ranking in both lists. In this case, the same-ranking rate can be ⅗ (i.e., 60%). This same-ranking rate can then be compared with a pre-set threshold to determine whether the outputted tree node is the N-Tree model prediction value of the corresponding weight value.

In Step S205, when the same-ranking rate between the obtained ranking list and the pre-set ranking list for the predicted users does not reach the threshold value, the weight value is adjusted. The adjusted weight value can be configured in the pre-configured N-Tree prediction model to respectively process the feature collection of each predicted user for the prediction calculation to determine the association-predicting value corresponding to the feature collection of each predicted user.

In Step S206, after adjusting the weight value, it is determined whether the same-ranking rate between the obtained ranking list (obtained from the association-predicting value corresponding to the determined feature collection) and the pre-set ranking list for the predicted users reaches the threshold value. If the same-ranking rate reaches the threshold value, Step S207 can be implemented. If the same-ranking rate does not reach the threshold value, Step S206 can be implemented.

In Step S207, the N-Tree prediction model configured with the adjusted weight value is outputted as the pre-configured N-Tree prediction model.

As disclosed herein, by configuring the N-Tree prediction model, common relationship factors between multiple strangers (e.g., predicted users) can be "machine" learnt to automatically generate a weight value of individual factors (e.g., feature data). Instead of artificially configuring weight value of an N-Tree prediction model, the disclosed methods can be used to more accurately configure the weight value to provide high degree of association between the end user (e.g., target user) and users to be recommended. Interactions between the end user and recommended user(s) are improved, which can facilitate users to expand the relationship chain. Friend recommendation can thus be automated and intelligent.

Figure 3:
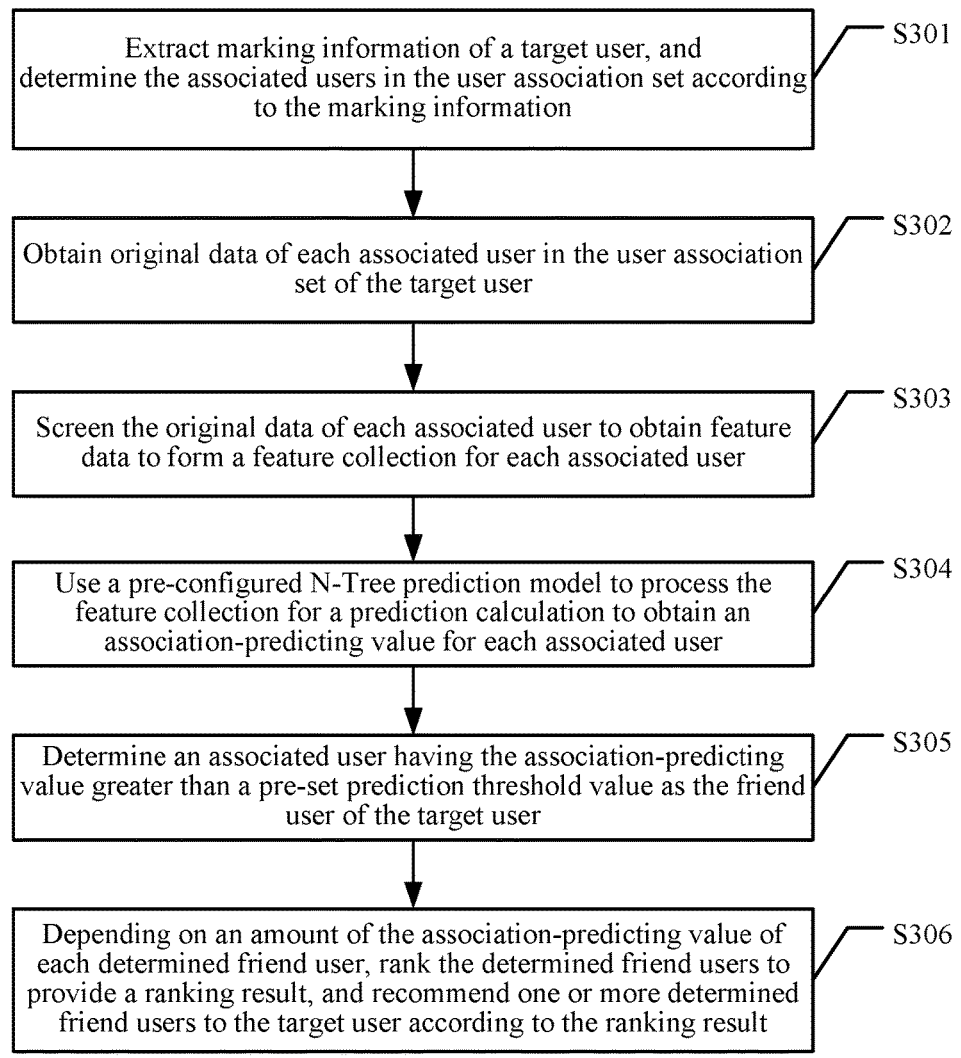
FIG. 3 depicts another exemplary method for friend recommendation consistent with various disclosed embodiments.

FIG. 3 depicts another exemplary method for friend recommendation consistent with various disclosed embodiments. The disclosed methods can be used in various application servers including communication applications, social networking applications, and/or other types of applications. When a user accesses to an application or initiates to find a friend, the user can be a target user to trigger the implementation of the disclosed methods for recommending one or more friends.

In Step S301, marking information of a target user is extracted. Associated users in the user association set are determined according to the marking information. The marking information includes account information of the target user, location information of the target user, and/or combinations thereof.

For example, the marking information can include registered companies, industries, schools, Zodiac signs, and/or locations for current registration (which can be confirmed by currently-used IP address) recorded in the account information of the target user and can then be extracted.

In Step S302, a user association set of the target user is obtained. The user association set includes a plurality of associated users that are associated with the target user. Original data of each associated user in the user association set of the target user is obtained. The original data include location relationship data, associated friend data, time relationship data, or combinations thereof, between each associated user and the target user.

In Step S303, the original data of each associated user are screened to obtain feature data to form a feature collection for each associated user.

In Step S304, a pre-configured N-Tree prediction model is used to process the feature collection for a prediction calculation to obtain an association-predicting value for each associated user. The N-Tree prediction model includes a prediction model based on gradient boosting decision tree (GBDT).

As described herein, implementation of Steps S302-S304 can refer to corresponding description of FIG. 1, while the pre-configuration of the pre-configured N-Tree prediction model can refer to corresponding description of FIG. 2.

In Step S305, an associated user having the association-predicting value greater than a pre-set prediction threshold value is determined as a friend user of the target user.

In Step S306, depending on an amount of the association-predicting value of each determined friend user, the determined friend users are ranked to provide a ranking result. One or more determined friend users are recommended to the target user according to the ranking result.

In one embodiment, one or more friends can be recommended to a target user according to a ranking result by displaying profile pictures of the one or more friends. In addition, an interface for "adding friend" can be configured in the profile picture. This is convenient for the target user, after clicking on the profile picture, to send out a request for adding as a friend and/or to further implement the process for adding the friend.

As disclosed, by extracting feature data to provide relationship factors of users, N-Tree prediction model can be used to automatically determine degree of association between the target user and user(s) to be recommended. Interactions between end user (target user) and recommended user(s) are improved, which can facilitate users to expand the relationship chain. Friend recommendation can thus be automated and intelligent.

Figure 4:
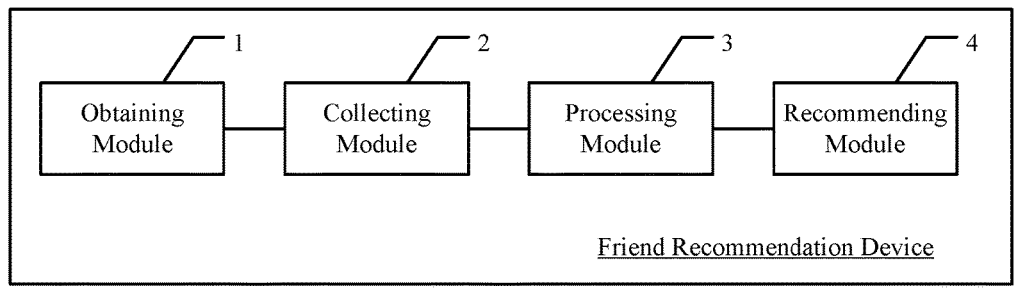
FIG. 4 depicts an exemplary device for friend recommendation consistent with various disclosed embodiments.

FIG. 4 depicts an exemplary device for friend recommendation consistent with various disclosed embodiments. The disclosed devices can be used in various application servers including communication applications, social networking applications, and/or other types of applications. When a user accesses to an application or initiates to find a friend, the user can be a target user to implement friend recommendation with respect to the target user.

The exemplary device for friend recommendation can include an obtaining module 1, a collecting module 2, a processing module 3, and/or a recommending module 4.

The obtaining module 1 is configured to obtain a user association set of a target user. The user association set includes multiple associated users that are associated with the target user. The obtaining module 1 is further configured to obtain original data of each associated user in the user association set of the target user. The original data include location relationship data, associated friend data, time relationship data, or combinations thereof, between each associated user and the target user.

The collecting module 2 is configured to screen the original data of each associated user to obtain feature data to form a feature collection for each associated user.

The processing module 3 is configured to use a pre-configured N-Tree prediction model to process the feature collection for a prediction calculation to obtain an association-predicting value for each associated user.

The recommending module 4 is configured, according to the association-predicting value of each associated user, to determine a friend user for the target user from the user association set and recommend the friend user to the target user.

For example, based on: a current location of the target user, a registered company that the target user is related to, the industry and/or school that the target user is related to, Zodiac sign of the target user, and/or any suitable content, a user association set, formed by one or more other users (users other than the target user, also referred to associated users) associated with the target user, can be determined from a registration server. The user association set can include one or more associated users, for example, from a same school or in a same school within a same time frame. Meanwhile, current locations, registered companies, industries, schools, Zodiac signs, birth places, and/or birth dates of these associated users can be used as original data.

For extracted original data, some data may not be useful for current recommendation. For example, initial data such as birth place, birth date, and/or other information may be determined useless for a current recommendation process. In this case, such initial data can be removed from consideration, while current locations, registered companies, industries, schools, and/or other suitable data from extraction can be used as feature data. The feature data can be collected to form a feature collection for each associated user.

The N-Tree prediction model is based on GBDT (i.e., gradient boosting decision tree) prediction model. By a prediction model containing multiple GBDTs pre-configured with corresponding weight values, the association-predicting value, under a corresponding weight value, of the feature collection of each associated user can be obtained.

Note that, the N-Tree prediction model is not a decision tree model formed by only one decision tree, but includes multiple decision trees, for example, about hundreds of decision trees with each decision tree having a reduced scale/size (e.g., the depth of each decision tree can be shallow). When predicting using the N-Tree prediction model, an inputted feature collection can be a collection (or combination) of, for example, city, company, and/or school. Each decision tree can have a weight value pre-configured at every tree node. When traversing each decision tree for prediction calculations, based on the weight value at every tree node for each decision tree, the collection can be processed for the prediction calculation to obtain a prediction value of each decision tree. Then all of the prediction values can be added up to obtain a final association-predicting value under the feature collection of this associated user.

As disclosed, by extracting feature data to provide relationship factors of users, the N-Tree prediction model can be used to automatically determine degree of association between the target user and user(s) to be recommended. Interactions between end user (target user) and recommended user(s) are improved, which can facilitate users to expand the relationship chain. Friend recommendation can thus be automated and intelligent.

Figure 5:
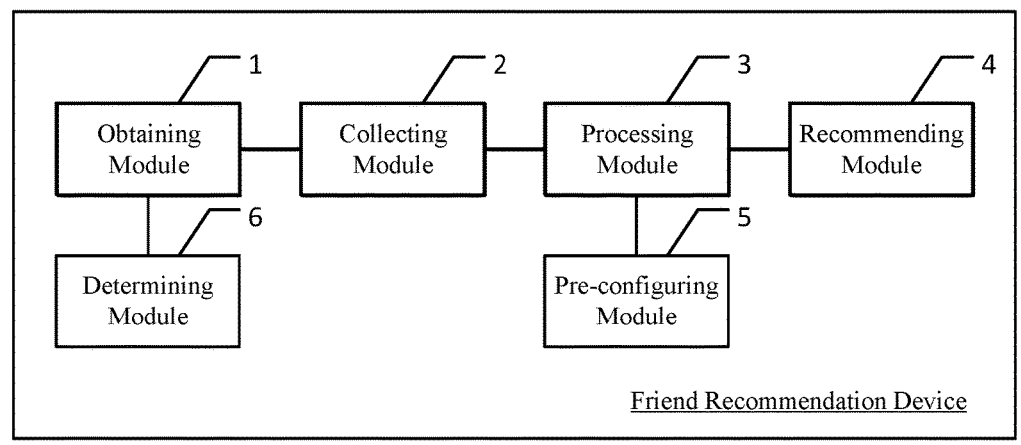
FIG. 5 depicts another exemplary device for friend recommendation consistent with various disclosed embodiments.

FIG. 5 depicts another exemplary device for friend recommendation consistent with various disclosed embodiments. The disclosed devices can be used in various application servers including communication applications, social networking applications, and/or other types of applications. Compared with the device depicted of FIG. 4, in addition to including obtaining module 1, collecting module 2, processing module 3, and recommending module 4, the friend recommendation device of FIG. 5 can further include a pre-configuring module 5 and/or a determining module 6.

The pre-configuring module 5 is configured to pre-configure the N-Tree prediction model including a prediction model based on gradient boosting decision tree (GBDT).

Figure 6:
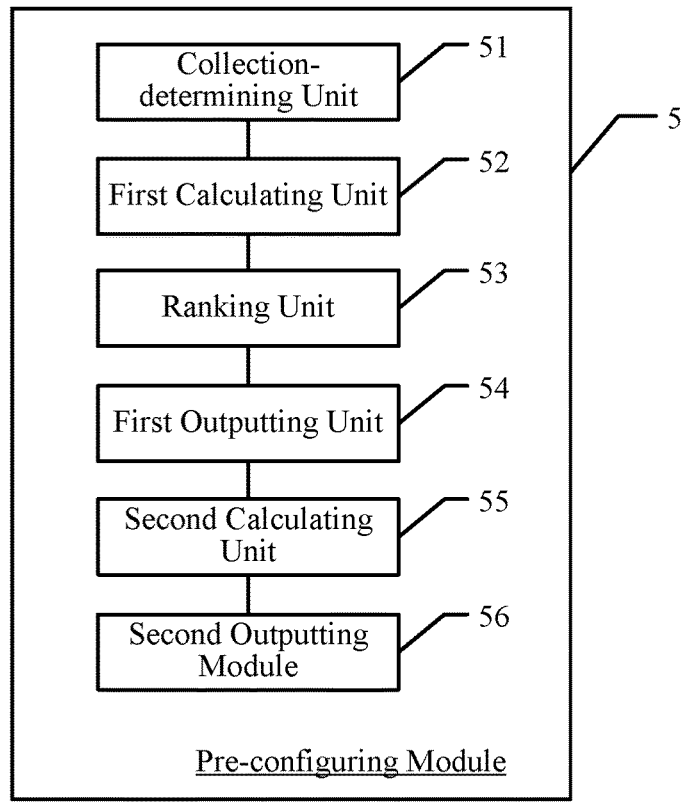
FIG. 6 depicts an exemplary pre-configuring module in FIG. 5 consistent with various disclosed embodiments.

For example, as shown in FIG. 6, an exemplary pre-configuring module 5 can include a collection-determining unit 51, a first calculating unit 52, a ranking unit 53, a first outputting unit 54, a second calculating unit 55, and/or a second outputting module 56.

The collection-determining unit 51 is configured to determine feature collections of multiple predicted users.

The first calculating unit 52 is configured to respectively process the feature collection of each predicted user for the prediction calculation using the pre-configured N-Tree prediction model having an initial weight value to determine the association-predicting value corresponding to the feature collection of each predicted user.

The ranking unit 53 is configured to rank each predicted user according to an amount of the association-predicting value to form a ranking list.

The first outputting unit 54 is configured, when a same-ranking rate between the obtained ranking list and a pre-set ranking list for the predicted users reaches a threshold value, to output the N-Tree prediction model configured with the initial weight value as the pre-configured N-Tree prediction model.

The second calculating unit 55 is configured, when the same-ranking rate between the obtained ranking list and the pre-set ranking list for the predicted users does not reach the threshold value, to adjust the weight value, and to use the pre-configured N-Tree prediction model having the adjusted weight value to respectively process the feature collection of each predicted user for the prediction calculation to determine the association-predicting value corresponding to the feature collection of each predicted user.

The second calculating unit 55 is further configured to repeat adjustment of the weight value until the same-ranking rate between the obtained ranking list and the pre-set ranking list for the predicted users reaches the threshold value.

The second outputting module 56 is configured to output the N-Tree prediction model having a finally-adjusted weight value as the pre-configured N-Tree prediction model.

Figure 7:
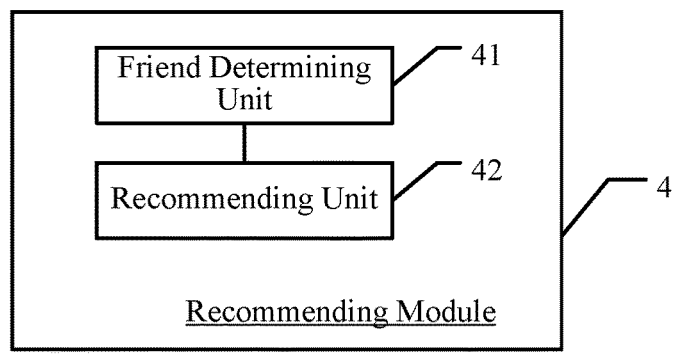
FIG. 7 depicts an exemplary recommending module in FIG. 5 consistent with various disclosed embodiments.

Optionally, as shown in FIG. 7, an exemplary recommending module 4 can include a friend determining unit 41, and/or a recommending unit 42.

The friend determining unit 41 is configured to determine an associated user having the association-predicting value greater than a pre-set prediction threshold value as the friend user of the target user.

The recommending unit 42 is configured, depending on an amount of the association-predicting value of each determined friend user, to rank the determined friend users to provide a ranking result, and to recommend one or more determined friend users to the target user according to the ranking result.

The recommending unit 42 can further be configured to recommend one or more friends to the target user according to the ranking result by displaying profile pictures of the one or more friends. In addition, an interface for "adding friend" can be configured in the profile picture. This is convenient for the target user, after clicking on the profile picture, to send out a request for adding as a friend and/or to further implement process for adding a friend.

Referring back to FIG. 5, the determining module 6 is configured to extract marking information of the target user, and to determine multiple associated users in the user association set according to the marking information. The marking information includes account information of the target user, location information of the target user, and/or combinations thereof.

For example, the determining module 6 can further be configured to extract the marking information including registered companies, industries, schools, Zodiac signs, and/or locations for current registration (which can be confirmed by currently-used IP address) recorded in the account information of the target user.

As disclosed, by extracting feature data to provide relationship factors of users, the N-Tree prediction model can be used to automatically determine degree of association between the target user and user(s) to be recommended. Interactions between end user (target user) and recommended user(s) are improved, which can facilitate users to expand the relationship chain. Friend recommendation can thus be automated and intelligent.

Figure 8:
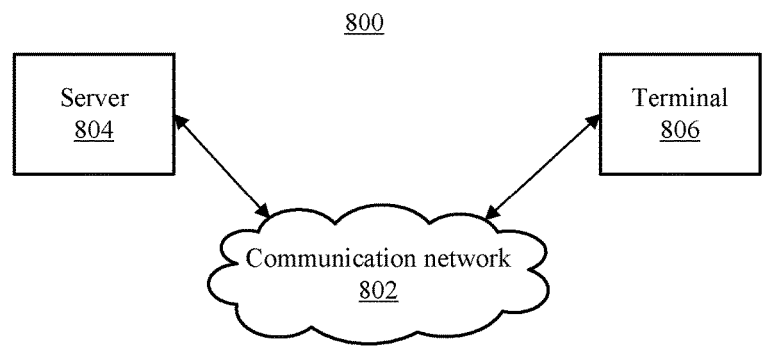
FIG. 8 depicts an exemplary environment incorporating certain disclosed embodiments.

The exemplary methods, devices and servers can be implemented, for example, in an exemplary environment 800 as shown in FIG. 8.

Environment 800 can include a server 804, a terminal device 806, and a communication network 802. The server 804 and the terminal device 806 may be coupled through the communication network 802 for information exchange, such as webpage browsing, Internet searching, data downloading, data transmitting, etc. Although only one terminal device 806 and one server 804 is shown in the environment 800, any number of terminal devices 806 or servers 804 may be included, and other devices may also be included.

Communication network 802 may include any appropriate type of communication network for providing network connections to the server 804 and terminal device 806 or among multiple servers 804 or terminal devices 806. For example, communication network 802 may include the Internet or other types of computer networks or telecommunication networks, either wired or wireless.

The terminal device 806 can include any appropriate user terminal with certain computing capabilities, such as a personal computer (PC), a work station computer, a server computer, a hand-held computing device (tablet), a smart phone or mobile phone, or any other user-side computing device.

The server 804 can be configured to provide certain server functionalities, such as database management and search engines. A server may also include one or more processors to execute computer programs in parallel.

Figure 9:
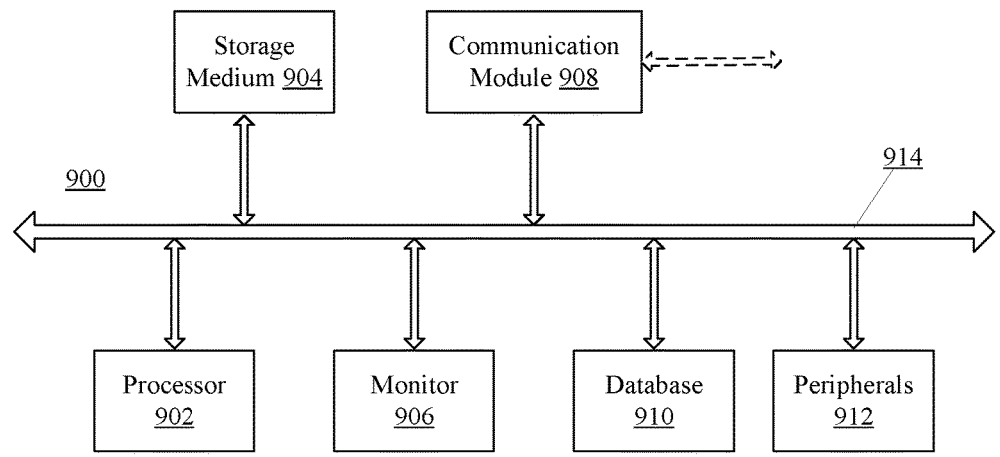
FIG. 9 depicts an exemplary computer system consistent with the disclosed embodiments.

The server 804 and the terminal device 806 may be implemented on any appropriate computing platform. FIG. 9 shows a block diagram of an exemplary computer system 900 suitable for the server 804 and/or the terminal device 806. As shown in FIG. 9, the exemplary computer system 900 may include a processor 902, a storage medium 904, a monitor 906, a communication module 908, a database 910, peripherals 912, and one or more bus 914 to couple the devices together. Certain devices may be omitted and other devices may be included.

Processor 902 can include any appropriate processor or processors. Further, processor 902 can include multiple cores for multi-thread or parallel processing. Storage medium 904 (e.g., non-transitory computer readable storage medium) may include memory modules, such as ROM, RAM, and flash memory modules, and mass storages, such as CD-ROM, U-disk, removable hard disk, etc. Storage medium 904 may store computer programs for implementing various processes, when executed by processor 902.

Further, peripherals 912 may include I/O devices such as keyboard and mouse, and communication module 908 may include network devices for establishing connections through the communication network 802. Database 910 may include one or more databases for storing certain data and for performing certain operations on the stored data, such as webpage browsing, database searching, etc.

In operation, terminal device 806 (e.g., operated by a user) may cause server 804 to perform certain actions, such as an Internet search or other database operations. Server 804 may be configured to provide structures and functions for such actions and operations. More particularly, server 804 may include a data searching system for real-time database searching.

As such, various embodiments solve technical problem of a server technology, and/or terminal device technology. It should be understood that steps described in various methods of the present disclosure may be carried out in order as shown, or alternately, in a different order. Therefore, the order of the steps illustrated should not be construed as limiting the scope of the present disclosure. In addition, certain steps may be performed simultaneously.

In the present disclosure each embodiment is progressively described, i.e., each embodiment is described and focused on difference between embodiments. Similar and/or the same portions between various embodiments can be referred to with one another. In addition, exemplary device and/or servers are described with respect to corresponding methods.

The disclosed methods, devices, and/or servers can be implemented in a suitable computing environment. The disclosure can be described with reference to symbol(s) and step(s) performed by one or more computers, unless otherwise specified. Therefore, steps and/or implementations described herein can be described for one or more times and executed by computer(s). As used herein, the term "executed by computer(s)" includes an execution of a computer processing unit on electronic signals of data in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

As used herein, the term "module" or "unit" can be software objects executed on a computing system. A variety of components described herein including elements, modules, units, engines, and services can be executed in the computing system. The methods, devices, and/or servers can be implemented in a software manner. Of course, the methods, devices, and/or servers can be implemented using hardware. All of which are within the scope of the present disclosure.

A person of ordinary skill in the art can understand that the units/modules included herein are described according to their functional logic, but are not limited to the above descriptions as long as the units/modules can implement corresponding functions. Further, the specific name of each functional module is used to be distinguished from one another without limiting the protection scope of the present disclosure.

In various embodiments, the disclosed units/modules can be configured in one device (e.g., a processing unit) or configured in multiple devices as desired. The units/modules disclosed herein can be integrated in one unit/module or in multiple units/modules. Each of the units/modules disclosed herein can be divided into one or more sub-units/modules, which can be recombined in any manner. In addition, the units/modules can be directly or indirectly coupled or otherwise communicated with each other, e.g., by suitable interfaces.

One of ordinary skill in the art would appreciate that suitable software and/or hardware (e.g., a universal hardware platform) may be included and used in the disclosed methods, devices, and/or servers. For example, the disclosed embodiments can be implemented by hardware only, which alternatively can be implemented by software products only. The software products can be stored in computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

For example, the disclosed methods can be implemented by an apparatus/device including one or more processor, and a non-transitory computer-readable storage medium having instructions stored thereon. The instructions can be executed by the one or more processors of the apparatus/device to implement the methods disclosed herein. In some cases, the instructions can include one or more modules corresponding to the disclosed methods.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods, devices, and servers for friend recommendation are provided. A user association set of a target user is obtained. Original data of each associated user in the user association set is obtained. The original data include location relationship data, associated friend data, time relationship data, or combinations thereof, between each associated user and the target user. The original data of each associated user is screened to obtain feature data to form a feature collection for each associated user. A pre-configured N-Tree prediction model is used to process the feature collection for a prediction calculation to obtain an association-predicting value for each associated user. According to the association-predicting value of each associated user, a friend user for the target user from the user association set is determined and recommended to the target user.

As disclosed herein, by configuring the N-Tree prediction model, common relationship factors between multiple strangers (e.g., predicted users) can be "machine" learnt to automatically generate a weight value of individual factors (e.g., feature data). Instead of artificially configuring weight value of an N-Tree prediction model, the disclosed methods can be used to more accurately configure the weight value to provide high degree of association between the end user (e.g., target user) and users to be recommended. Interactions between the end user and recommended user(s) are improved, which can facilitate users to expand the relationship chain. Friend recommendation can thus be automated and intelligent.

REFERENCE SIGN LIST

Obtaining module 1
Collecting module 2
Processing module 3
Recommending module 4
Pre-configuring module 5
Determining module 6
Friend determining unit 41
Recommending unit 42
Collection-determining unit 51
First calculating unit 52
Ranking unit 53
First outputting unit 54
Second calculating unit 55
Second outputting module 56
Environment 800
Communication network 802
Server 804
Terminal 806
Processor 902
Storage medium 904
Monitor 906
Communications 908
Database 910
Peripherals 912
Bus 914

What is claimed is:

1. A method for friend recommendation, comprising:
  obtaining a user association set of a target user, wherein the user association set comprises a plurality of associated users that are associated with the target user;
  obtaining original data of each associated user in the user association set of the target user, wherein the original data comprise location relationship data, associated friend data, time relationship data, or combinations thereof, between each associated user and the target user;

screening the original data of each associated user to obtain feature data to form a feature collection for each associated user;

using a pre-configured N-Tree prediction model to process the feature collection for a prediction calculation to obtain an association-predicting value for each associated user, comprising:

(a) determining feature collections of a plurality of predicted users;

(b) configuring an initial weight value in the pre-configured N-Tree prediction model to respectively process the feature collection of each predicted user for the prediction calculation to determine the association-predicting value corresponding to the feature collection of each predicted user;

(c) ranking each predicted user according to an amount of the association-predicting value to form a ranking list;

(d) when a same-ranking rate between the obtained ranking list and a pre-set ranking list for the predicted users reaches a threshold value, outputting the N-Tree prediction model configured with the initial weight value as the pre-configured N-Tree prediction model; and (e) when the same-ranking rate between the obtained ranking list and the pre-set ranking list for the predicted users does not reach the threshold value, adjusting the weight value, and repeating steps (b)-(e) by:

configuring the adjusted weight value in the pre-configured N-Tree prediction model to respectively process the feature collection of each predicted user for the prediction calculation to determine the association-predicting value corresponding to the feature collection of each predicted user, until the same-ranking rate between the obtained ranking list and the pre-set ranking list for the predicted users reaches the threshold value, and outputting the N-Tree prediction model configured with a finally-adjusted weight value as the pre-configured N-Tree prediction model; and according to the association-predicting value of each associated user, determining a friend user for the target user from the user association set and recommending the friend user to the target user.

2. The method according to claim 1, wherein the N-Tree prediction model comprises a prediction model based on gradient boosting decision tree (GBDT).

3. The method according to claim 1, wherein the step of according to the association-predicting value of each associated user, determining a friend user for the target user from the user association set and recommending the friend user to the target user comprises:

determining an associated user having the association-predicting value greater than a pre-set prediction threshold value as the friend user of the target user; and depending on an amount of the association-predicting value of each determined friend user, ranking the determined friend users to provide a ranking result, and recommending one or more determined friend users to the target user according to the ranking result.

4. The method according to claim 3, wherein the step of obtaining the user association set of the target user comprises:

extracting marking information of the target user, and determining the plurality of associated users in the user association set according to the marking information, wherein the marking information comprises account information of the target user, location information of the target user, and combinations thereof.

5. A non-transitory computer-readable storage medium comprising instructions stored thereon, wherein, when being executed, the instructions cause one or more processors of a device to perform the method according to claim 1.

6. A device for friend recommendation, comprising:

an obtaining module, configured to obtain a user association set of a target user, wherein the user association set comprises a plurality of associated users that are associated with the target user, wherein the obtaining module is further configured to obtain original data of each associated user in the user association set of the target user, wherein the original data comprise location relationship data, associated friend data, time relationship data, or combinations thereof, between each associated user and the target user;

a collecting module, configured to screen the original data of each associated user to obtain feature data to form a feature collection for each associated user;

a processing module, configured to use a pre-configured N-Tree prediction model to process the feature collection for a prediction calculation to obtain an association-predicting value for each associated user, wherein the pre-configuring N-Tree prediction module comprises:

a collection-determining unit, configured to determine feature collections of the plurality of predicted users;

a first calculating unit, configured to respectively process the feature collection of each predicted user for the prediction calculation using the pre-configured N-Tree prediction model having an initial weight value to determine the association-predicting value corresponding to the feature collection of each predicted user;

a ranking unit, configured to rank each predicted user according to an amount of the association-predicting value to form a ranking list;

a first outputting unit configured, when a same-ranking rate between the obtained ranking list and a pre-set ranking list for the predicted users reaches a threshold value, to output the N-Tree prediction model configured with the initial weight value as the pre-configured N-Tree prediction model;

a second calculating unit configured:

when the same-ranking rate between the obtained ranking list and the pre-set ranking list for the predicted users does not reach the threshold value, to adjust the weight value, and to use the pre-configured N-Tree prediction model having the adjusted weight value to respectively process the feature collection of each predicted user for the prediction calculation to determine the association-predicting value corresponding to the feature collection of each predicted user, and to repeat adjustment of the weight value until the same-ranking rate between the obtained ranking list and the pre-set ranking list for the predicted users reaches the threshold value; and a second outputting module, configured to output the N-Tree prediction model having a finally-adjusted weight value as the pre-configured N-Tree prediction model; and a recommending module configured, according to the association-predicting value of each associated user, to determine a friend user for the target user from the user association set and recommend the friend user to the target user.

7. The device according to claim 6, further comprising:
a pre-configuring module, configured to pre-configure the N-Tree prediction model comprising a prediction model based on gradient boosting decision tree (GBDT).

8. The device according to claim 6, wherein the recommending module comprises:
a friend determining unit, configured to determine an associated user having the association-predicting value greater than a pre-set prediction threshold value as the friend user of the target user; and
a recommending unit configured, depending on an amount of the association-predicting value of each determined friend user, to rank the determined friend users to provide a ranking result, and to recommend one or more determined friend users to the target user according to the ranking result.

9. The device according to claim 8, further comprising:
a determining unit, configured to extract marking information of the target user, and to determine the plurality of associated users in the user association set according to the marking information, wherein the marking information comprises account information of the target user, location information of the target user, and combinations thereof.

10. A server comprising the device according to claim 6.

* * * * *